United States Patent [19]

Lahtinen

[11] Patent Number: 6,148,200

[45] Date of Patent: Nov. 14, 2000

[54] LOAD REDUCTION OF A VISITOR LOCATION REGISTER

[75] Inventor: Lauri Lahtinen, Espoo, Finland

[73] Assignee: Nokia Telecommunications Oy, Espoo, Finland

[21] Appl. No.: 09/091,950

[22] PCT Filed: Dec. 20, 1996

[86] PCT No.: PCT/FI96/00685

§ 371 Date: Jun. 26, 1998

§ 102(e) Date: Jun. 26, 1998

[87] PCT Pub. No.: WO97/24898

PCT Pub. Date: Jul. 10, 1997

[30] Foreign Application Priority Data

Dec. 29, 1995 [FI] Finland ................................ 956355

[51] Int. Cl.[7] .................................................... H04Q 7/20
[52] U.S. Cl. .......................... 455/433; 455/435; 455/458; 455/422; 455/446; 455/449
[58] Field of Search .................................. 455/422, 433, 455/435, 443, 444, 445, 446, 448, 449, 458, 560, 456

[56] References Cited

FOREIGN PATENT DOCUMENTS

| 0 475 865 | 3/1992 | European Pat. Off. . |
| 0 666 700 | 8/1995 | European Pat. Off. . |
| WO 92/13428 | 8/1992 | WIPO ............................. H04Q 7/04 |
| WO 96/07277 | 3/1996 | WIPO . |

*Primary Examiner*—William G. Trost
*Assistant Examiner*—Raymond B. Persino
*Attorney, Agent, or Firm*—Altera Law Group, LLC

[57] ABSTRACT

A problem arises when the data of the visitor location register (VLR) are lost for some reason. In this case, only the visitor location register (VLRn) in whose area the mobile station (MS) is located is known. The mobile station (MS) must then be paged in all location areas (LAn) of the visitor location register (VLR). Such paging of mobile stations causes a significant overload. The overload is reduced, according to the invention, by dividing the area covered by a physical visitor location area (VLR) into areas of a plurality of logical visitor location registers (LVLRn). In connection with location updatings, not only the physical visitor location register (VLR) is stored by also information on the logical visitor location register (LVLRn) in whose area the mobile station (MS) is located; in a problematic situation where the switching centre (MSC) is not aware of the location area of the mobile station(MS), the mobile station (MS) is paged, at least at first, only in the area of the logical visitor location register (LVLRn).

10 Claims, 2 Drawing Sheets

LOAD REDUCTION OF A VISITOR LOCATION REGISTER

The invention relates to mobile communication systems and particularly to reducing the load of their visitor location registers.

Figure 1:
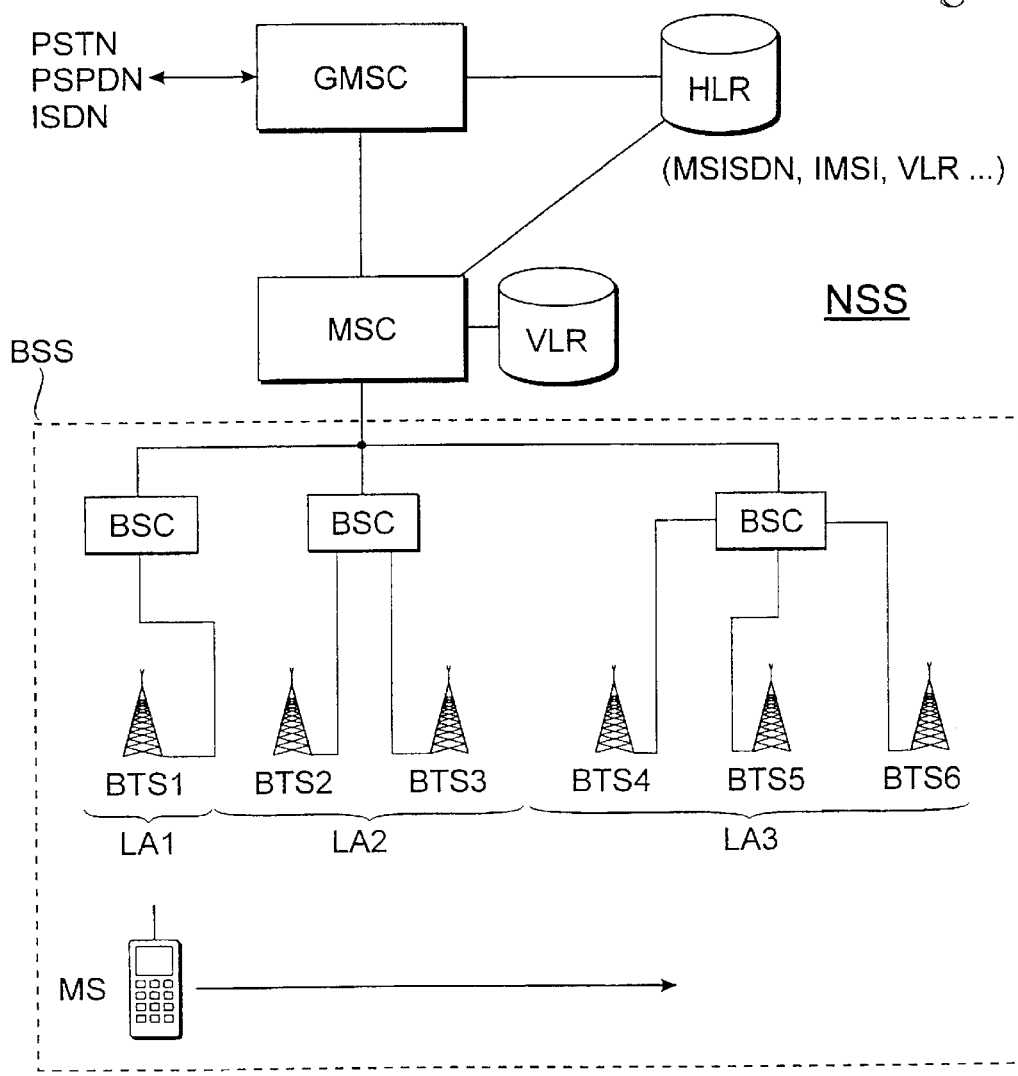

FIG. 1 illustrates the roaming of a mobile station MS in a mobile communication network or in a network subsystem NSS. In this example, the NSS comprises six base transceiver stations BTS1 to BTS6, which can be controlled by one or more base station controllers BSC. Each base station BTS serves one cell. When an MS terminated call is switched through the network NSS, the NSS must know the area in which the MS is to be paged. The area in which the MS is paged is called a location area LA.

The size of the location area LA is a compromise. If the location area is very large, the MS must be paged in the area of several base stations BTS. This means that mobile stations are also paged in base station areas where they are not located. This consumes the capacity of radio channels. If the location area is small, location updatings must be performed frequently. FIG. 1 shows, by way of illustration, three location areas LA1–LA3, which cover 1, 2 and 3 base stations, respectively. The base stations BTS continuously broadcast information on themselves and their environment, such as a base station identifier BSI and a location area identifier LAI. On the basis of the LAI, an MS registered in a BTS knows in which LA it is located at each moment. If the MS, when changing the BTS, observes that the LAI has changed, it sends a location update request or message to the network NSS. The LA of the MS is updated in the visitor location register VLR in whose area the MS is located at that moment. The VLR typically stores e.g. the subscriber's IMSI (International Mobile Subscriber Identity) number, MSISDN number, subscriber service data and LAI.

Information on the VLR in whose area the MS is located is sent to the home location register of the MS. The HLR stores permanent subscriber data, which are not dependent on the subscriber's location at a given moment: e.g. the subscriber's MSISDN and IMSI, subscriber service data, and routing data to the VLR in whose location area the MS is located.

Figure 2:
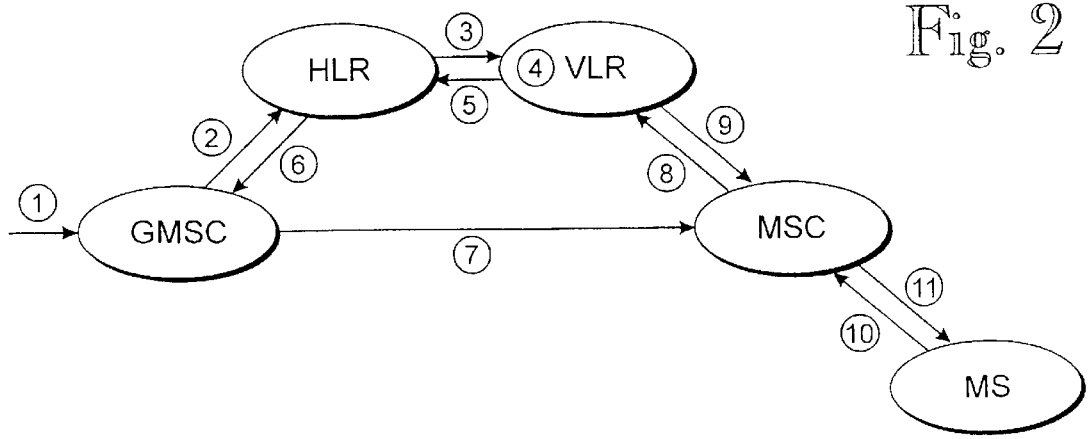

FIG. 2 illustrates the setting up of an MS terminated call in a GSM-type mobile communication system. If the MS of FIG. 1 is not located within the area of its own home location register, the parts of FIG. 2 correspond to those of FIG. 1; however, the HLR and VLR are associated with different mobile services switching centres MSC. In step 1, a call arrives at a gateway mobile switching centre GMSC. In step 2, the GMSC defines the subscriber's home location register HLR on the basis of the called subscriber's directory number MSISDN, and sends it a request for routing data. Information on the VLR in whose area the subscriber is located is updated in the subscriber's HLR in connection with location updating. On the basis of this information, the HLR sends the VLR a 'Provide Roaming Number' request in step 3. The IMSI of the MS subscriber is also sent to the VLR in this request. In step 4, the VLR stores the data it has received and assigns a mobile station roaming number MSRN. In step 5, the VLR sends the MSRN it has assigned to the HLR, which in step 6 sends it to the switching centre GMSC that requested the routing data. The roaming number domain is defined in such a way that a call is always directed to the MSC whose VLR has assigned the roaming number in question. On the basis of the MSRN, the GMSC is thus able to route the call forward by sending an initial address message in step 7 to the MSC indicated by the MSRN.

In this example, the MSC finds out on the basis of the MSRN that the call will terminate in its own area. In step 8, the MSC requests the data of the called subscriber from its own VLR call set-up. In a normal case, the VLR returns the requested data in step 9 for setting up the call. This is indicated by arrows 10 and 11.

A problem arises when the data of the VLR are lost for some reason. This may happen, for instance, when the VLR is reinitialized, possibly during software updating or equipment maintenance. In this case, only the VLR in whose area the MS is located is known (on the basis of the HLR of the MS). The MS must then be paged in all location areas LA where there are mobile stations whose data are stored in the VLR in question. If the VLR serves a large number of subscribers, such paging of mobile stations causes a significant overload mainly in three areas: 1) between the MSC and the base station system BSS; 2) in the signalling process of the BSS; and 3) on radio channels. The BSS comprises a base station controller BSC and base stations BTS controlled by the BSC. As a result of the overload, some of the MS terminated calls fail.

The object of the invention is thus to provide a method and an apparatus implementing the method in such a manner that the above-mentioned overload problems are solved. The objects of the invention are achieved with methods and systems characterized by what is disclosed in the independent claims. Preferred embodiments are disclosed in the dependent claims.

The invention is based on dividing the area of a physical VLR into areas of a plurality of logical VLRs. When a mobile station performs location updating, the location update request sent by the VLR to the HLR also contains information on the logical VLR in whose area the mobile station is located. This information is transparent to the HLR, i.e. the HLR stores it but does not react to it in any way.

In the case of an incoming call, signalling takes place as before. In a problematic situation where the VLR is not aware of the location area of the MS, the physical VLR receives the address of the logical VLR of the MS from the HLR with normal signalling. This information is included in a 'Provide Roaming Number' message. The physical VLR thus limits the paging to the area of the logical VLR. In the most extreme case, the area of the logical VLR may even be only one location area.

It is an advantage of the method and system of the invention that the network is considerably less loaded in problematic situations than in prior art systems. Another advantage of the arrangement of the invention is that the modifications to be made in an existing system are relatively small, for instance modifications in the MSC software. The modifications are compatible with the existing systems in every respect. A network can thus employ—simultaneously and in a flexible manner—both switching centres modified according to the invention and switching centres not modified according to the invention.

Figure 3:
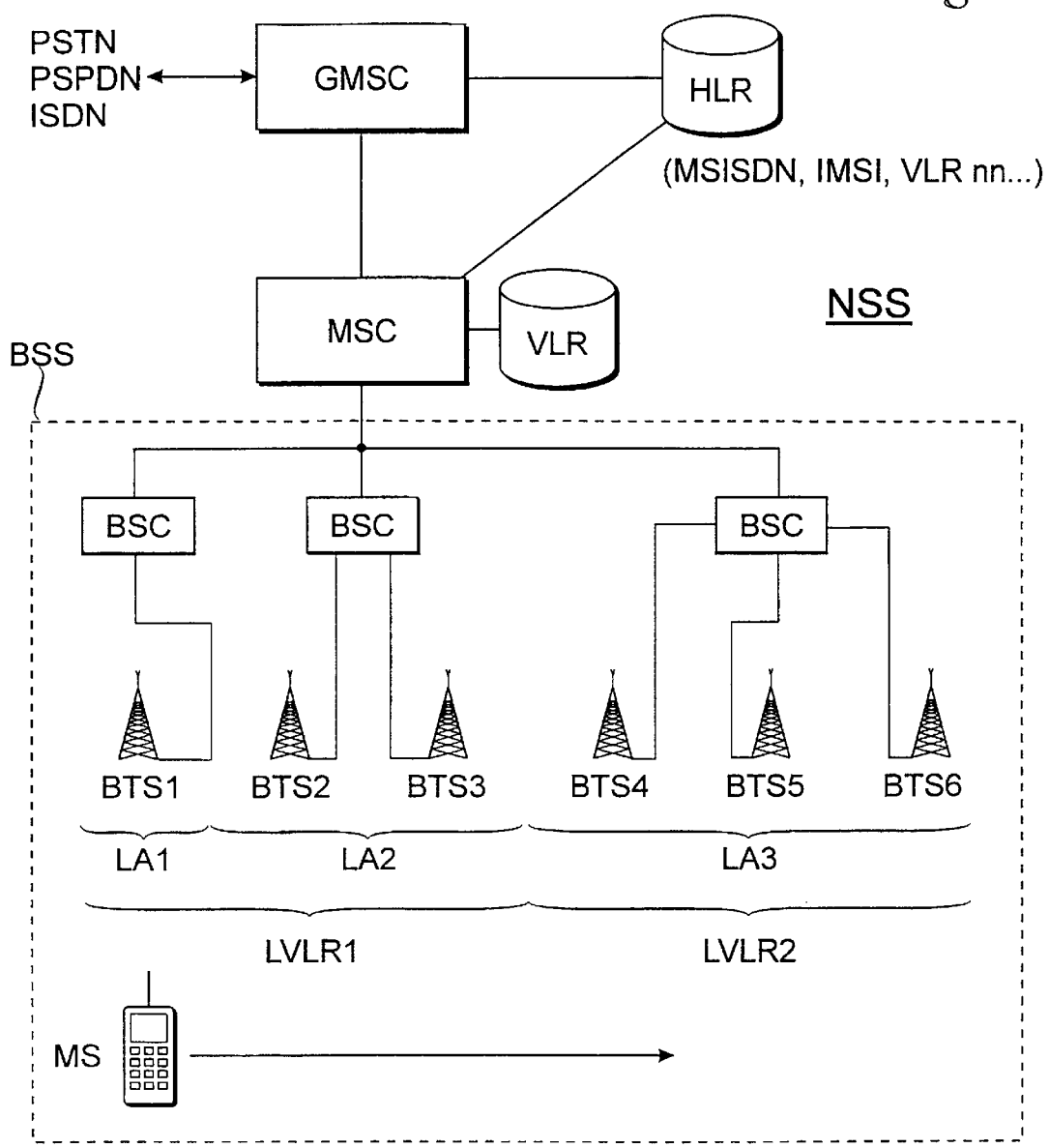

In the following, the invention will be described in greater detail by means of preferred embodiments with reference to the accompanying drawings, in which FIG. 1 shows the parts of a mobile telephone network that are essential to the invention;

FIG. 2 shows the steps of a signalling process of a mobile telephone network that are essential to the invention; and FIG. 3 shows location areas of a mobile telephone network, divided into areas of a plurality of logical visitor location registers.

With reference to FIG. 3, the overload of a mobile telephone network is limited, according to the invention, by dividing the area of a physical visitor location register VLR into areas of a plurality of logical visitor location registers LVLRn. For reasons of clarity, the area of the physical VLR is divided in FIG. 3 into areas of only two logical visitor location registers LVLR1 and LVLR2. In practical applications, a suitable number n of LVLRs in the area of one physical VLR could be, for example, 5 to 10. The system of FIG. 3 would require the following modifications in the prior art solution of FIGS. 1 and 2:

1. Defining and naming LVLRs of suitable size. In the naming, it is sufficient to use, for example, 1 or 2 digits after the number of the VLR.
2. The message sent by the MSC to the HLR in connection with the location updating of an MS also contains information on the LVLR in whose area the MS is located. This information is transparent to the HLR, i.e. the HLR processes it as an ordinary number of a physical VLR which is only 1 or 2 digits longer than it would be without the identifier n of the LVLR.
3. In the case of an MS terminated call, the changes will not become visible until the data of the VLR have been lost for one reason or another, i.e. the VLR does not know the location area of the MS. In this case, the MSC (and its VLR) receives the identifier of the LVLR of the MS from the HLR in connection with normal signalling (in a 'Provide Roaming Number' message). On the basis of this information, the MSC may limit the paging of the MS to only the area of the LVLR.

According to the prior art, the following information, for example, is stored in a HLR:

| an MS whose IMSI number is | is in the area of a VLR whose GT address is |
|---|---|
| IMSI | NCC NDC VLRn | where:
GT=Global Title
NCC=National Country Code
NDC=National Destination Code
VLRn=Visitor Location Register number.

According to the invention, the following information is correspondingly stored in the HLR:

| an MS whose IMSI number is | is in the area of a VLR whose GT address is |
|---|---|
| IMSI | NCC NDC VLRn nn | where
nn=the number of the LVLR (1 or 2 digits) within the physical VLRn.

The specification of a VLR as LVRLs is implemented according to the invention for instance as software modifications in the MSC. The software modifications are as follows:

1. The MSC must keep a log of which location areas LAn belong to which logical visitor location registers LVLRn.
2. In connection with location updating of an MS, the MSC must also send the HLR of the MS information on the LVLRn in whose area the MS is located.
3. In problematic situations where the data of the physical VLR have been lost, the MSC must, when paging the MS, at least at first limit the paging to only the LVLRn area where the location of the MS has last been updated.

Dividing a visitor location register VLR into (or specifying a VLR as) logical visitor location registers LVLRn reduces the congestion peaks occurring in problematic situations. If the number n of LVLRs within the area of a physical VLR is five, for example, the MS must be paged in an area that is five times smaller, and the load caused by the paging is reduced accordingly. There is, nevertheless, a side effect: the number of location updatings grows by the same coefficient. However, the advantages resulting from the reduction of congestion peaks outnumber the drawbacks caused by the additional traffic caused the location updatings.

It will be obvious to one skilled in the art that the examples described above are in every respect intended to illustrate the invention, not to restrict it. The invention has been described, by way of example, with reference to a GSM system, but it may also be applied to other kinds of mobile communication systems. The invention and its embodiments are thus not limited to the examples described above, but they may be modified within the scope of the appended claims.

What is claimed is:

1. A method for updating location of a mobile station (MS) in a digital mobile telephone network (NSS), wherein one home location register (HLR) stores information on the physical visitor location register (VLR) in the area of which the mobile station (MS) is located, characterized in that the area covered by a physical visitor location register (VLR) is divided into areas of a plurality of logical visitor location registers (LVLRn); and the home location register (HLR) stores, in addition to the physical visitor location register (VLR), information on the logical visitor location register (LVLRn) in whose area the mobile station (MS) is located.

2. A method according to claim 1 characterized in that said physical visitor location register (VLR) is divided hierarchically, whereby each logical visitor location register (LVLR) is subject to a single physical visitor location register (VLR).

3. A method according to claim 2, characterized in that said areas of said logical visitor location registers (LVLRn) are formed on the basis of geographical location, each area preferable comprising a small integer number of location areas.

4. A method according to claim 1, characterized in that said areas of said logical visitor location registers (LVLRn) are formed on the basis of geographical location, each area preferably comprising a small integer number of location areas.

5. A method for paging a mobile station (MS) in the area of a mobile services switching centre (MSC) in a digital mobile telephone network wherein, at any time, the location area (LA) of a mobile station (MS) is maintained in one Visitor Location Register (VLR) and the information on the VLR is maintained in one Home Location Register (HLR), when information on the location area (LA) of the mobile station (MS) has been lost by the switching centre (MSC), characterized in that the area covered by the physical visitor location register (VLR) of the switching centre (MSC) is divided into areas of a plurality of logical visitor location registers (LVLRn); and the mobile station (MS) is paged, at least at first, only in the area of the logical visitor location register (LVLRn) last indicated by the mobile station.

6. A method according to claim 5, characterized in that said physical visitor location register (VLR) is divided hierarchically, whereby each logical visitor location register (LVLR) is subject to a single physical visitor location register (VLR).

7. A method according to claim 6, characterized in that said areas of said logical visitor location registers (LVLRn) are formed on the basis of geographical location, each area preferable comprising a small integer number of location areas.

8. A method according to claim 5, characterized in that said areas of said logical visitor location registers (LVLRn) are formed on the basis of geographical location, each area preferable comprising a small integer number of location areas.

9. A mobile services switching centre (MSC) in a digital mobile telephone network wherein, at any time, the location information of a mobile station (MS) is maintained in one Visitor Location Register (VLR) and the information on the VLR is maintained in one Home Location Register (HLR), said mobile services switching centre (MSC) comprising a physical visitor location register (VLR) and being adapted to transmit information to a home location register (HLR) of the mobile telephone network on the physical visitor location registers (VLR) in the area of which each mobile station (MS) is located, characterized in that the area covered by the physical visitor location register (VLR) of the switching centre (MSC) is divided into areas of a plurality of logical visitor location registers (LVLRn); and the switching centre (MSC) is also adapted to transmit information to the home location register (HLR) on the logical visitor location registers (LVLRn) in the area of which each mobile station (MS) is located.

10. A location update message in a digital mobile telephone network (NSS) wherein, at any time, the location information of a mobile station (MS) is maintained in one Visitor Location Register (VLR) and the information on the VLR is maintained in one Home Location Register (HLR), said location update message containing information on the visitor location register (VLR) in whose area the mobile station (MS) is located, characterized in that the location update message further contains information on the logical visitor location register (LVLRn) in the area of which the mobile station (MS) is located.

* * * * *